United States Patent

[11] 3,561,788

| [72] | Inventors | Richard G. Carlson<br>Greendale;<br>Craig W. Cannon, New Berlin, Wis. |
|---|---|---|
| [21] | Appl. No | 778,047 |
| [22] | Filed | Nov. 22, 1968 |
| [45] | Patented | Feb. 9, 1971 |
| [73] | Assignee | Allis-Chalmers Manufacturing Company<br>Milwaukee, Wis. |

[54] HITCH ADAPTER
10 Claims, 8 Drawing Figs.

[52] U.S. Cl. .................................................. 280/461,
172/272, 172/448
[51] Int. Cl. .................................................. B60d 1/04
[50] Field of Search .......................................... 280/461,
461(.1), 415, 479; 172/272, 448

[56] References Cited
UNITED STATES PATENTS

| 3,151,883 | 10/1964 | Stuart .......................... | 280/415 |
| 3,195,651 | 7/1965 | Todd ............................ | 280/461(.1)X |

FOREIGN PATENTS

| 1,036,257 | 7/1966 | Great Britain ................ | 280/479 |

*Primary Examiner* — Leo Friaglia
*Attorneys* — Arthur L. Nelson, Kenneth C. McKivett and Robert B. Benson

ABSTRACT: A tractor hitch adapter carried on a three-point hitch for connecting a tractor to an implement.

PATENTED FEB 9 1971
3,561,788
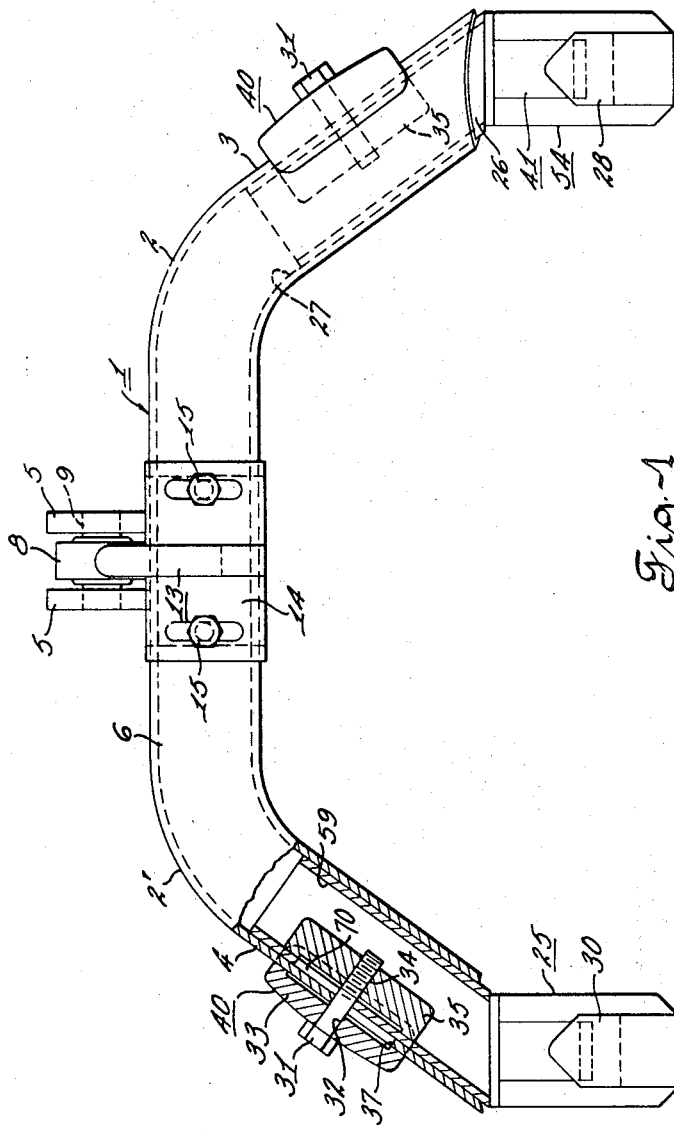
Inventors
Richard G. Carlson
Craig W. Cannon
Attorney

HITCH ADAPTER

This invention relates to a tractor hitch and more particularly to an adapter carried on a tractor three-point hitch having hooks for connecting to an implement.

The attachment of a tractor to an implement has become increasingly complex with the increase in size of the tractor and the increase in the functions required of the tractor in combination with the implement. The conventional drawbar connected to an implement which was conventional years ago has largely been replaced by the three-point hitch. The three-point hitch provides a means for more desirable weight distribution between the implement and the rear wheels of the tractor for positive traction. The three-point hitch is presently used with many types of implements. An even more sophisticated type of hitching arrangement is needed with the increase in size and power of the tractor which make it nearly impossible for a single operator to manually move the implement sufficiently to couple the tractor and implement. Consequently, an attachment is being developed for use in combination with a three-point hitch and implement. Accordingly, this invention provides such an adapter with means for connection to the three-point hitch at the tractor and to conveniently and quickly hitch to the implement. The adapter is structurally strong enough to support the implement, and is constructed with standard dimensions for easily converting the adapter for category 2 or category 3 type implements. Means are provided in the adapter to compensate for wear, to accommodate an odd-size tractor or implement, and also provide a means to conveniently replace any part of the adapter which receives the greatest amount of wear during use.

It is an object of this invention to provide a tubular construction in an adapter for providing a quick hitch of the tractor to the implement.

It is another object of this invention to provide a means on the adapter for simultaneous horizontal and vertical extension for contraction of divergent arms and also to adjust for vertical or horizontal dimensions of the implement.

It is a further object of this invention to provide simultaneous horizontal and vertical adjustment of the arms and also vertical adjustment of the adapter.

It is a further object of this invention to provide in an adapter tubular construction with telescoping arms and fastening means to securely lock the extension of said arms in any of an infinite number of positions within a predetermined range.

The objects of this invention are accomplished by providing tubular construction of the adapter wherein downwardly divergent arms of the base member receive mating tubular extension hooks which may be extended or retracted to provide suitable horizontal and vertical adjustment of the upper and lower hooks. The upper hook is also provided with a vertical adjustment to accommodate wear, or adjustment to odd size of vehicles to facilitate ease in connection and positive engagement when the vehicle is attached to the adapter. A fastening means is also provided for firmly locking each extension hook with the arm to provide an infinite positioning of the extension hook to accommodate any horizontal or vertical dimension desired.

The preferred embodiments of this invention will be described in the subsequent paragraphs and are illustrated in the attached drawing wherein:

FIG. 1 illustrates a rear view of the adapter;

FIG. 2 illustrates a side elevation view of the adapter with portions broken away to show a latching arrangement;

FIG. 3 illustrates a fragmentary view of the fastening means;

FIG. 4 is a fragmentary cross-sectional view taken on line IV-IV of FIG. 3;

FIG. 5 is a side elevation view of the upper hook and the antifriction bearing mounting for the upper fastening bar on the implement;

FIG. 6 is a cross-sectional view taken along line VI-VI of FIG. 5;

FIG. 7 is a fragmentary view showing a modification of the upper hook structure of the adapter; and FIG. 8 is a fragmentary cross-sectional view taken on line VIII-VIII of FIG. 7.

Referring to FIG. 1, the base member 1 is of tubular construction formed with two bends 2 and 2' forming downwardly diverging arms 3 and 4. It is understood that the divergent arms 3 and 4 may extend at the angle indicated on their lower portion to form a V illustrated in a modification shown in FIG. 7, which can be formed by a single bend 50.

The base member 1 is constructed with struts 5 fabricated to the tubular member 6 and is formed with an opening 7 for receiving a cross pin 9 adapted for connecting the tubular member 1 to the upper link 8 of the tractor. A support 10 is also fabricated on the tubular member 6 which forms a serrated surface 11 for engaging a mating serrated surface 12 on the hook 13. The hook 13 is supported on the plate 14 which is fastened by a plurality of bolts 15. The hook 13 receives a pin 16 of the implement. The hook 13 has a vertically extending portion 17 to facilitate initial engagement with the cross pin 16 when the implement is hooked to the adapter. The pin 16, as shown in FIGS. 5 and 6, is a modification wherein the mast 18 of an implement is fitted with an antifriction bearing 19 which is supported on the cross pin 20. The cross pin 20, as shown, is seated within the openings 21 of the mast 18.

FIG. 6 illustrates a cross-sectional view of the antifriction bearing 19 with the race 22 and rollers rotatably supported on the cross pin 20. Crossbar 20 is fastened by means of a washer 23 and a key 24 which locks the assembly in position. The hook 13 is shown in cross section as well as the mast 18 to more clearly illustrate the relative position of the parts. The plate 14 supports the hook 13.

Each of the arms 3 and 4 is connected to an extension member 54 and 25, respectively. The extension member 54 includes an extension portion 26 extending within the opening 27 of the arm 3. The extension member 54 defines a lower hook 28 adapted for receiving a crossbar 29 on the implement. The hook 28 is offset with relation to the extension portion 26 and has an upwardly facing opening.

Referring to the extension member 25, a portion is cross-sectioned to show the extension portion 59 integral with the hook 25. A fastener includes the bolt 31 extending through an opening 32 in the jaw 33. The bolt 31 threadedly engages an opening 34 in the second jaw 35. When the bolt 31 is screwed down snugly against the upper surface of the jaw 33, the jaws 33 and 35 firmly seat on the external periphery of the arm 4 and internal periphery of the extension portion 59 in a locking manner.

FIGS. 3 and 4 illustrate the bolt 31 in the upper position of the slot 37 in the arm 4 and in the lower position of slot 70 in extension member 25. The extreme positions of the slots 37 and 70 may be constructed to define the positioning of the extension members 54 and 25 to accommodate an implement of the category 2 or category 33 dimensions. Any position in between the extremes may also be used since the fastening device 40 will firmly lock the extension members 54 and 25 in any of an infinite number of positions within the extreme range of the slot.

The extension member 25 is shown in FIG. 2 wherein the lower portion of the extension member 25 defines the hook 30 with a latch 41 which is spring loaded by the spring 42 and releasable by the cable 43. Cable 43 and clevis 81 are connected to the rod 82 by pin 83. When the crossbar 29 is dropped into the opening 44 the spring-loaded latch 41 locks the bar 29 in position.

The rearward portion of the extension member 25 is also provided with an opening 45 to receive a pin 46 which fastens the lower draft arm 47 to the extension member 25. It can be seen that two lower draft arms 47 and the upper link 8 supports the adapter 1 on the tractor when the adapter is in its operating position.

FIGS. 7 and 8 show the hook 60 integral with the eye 61 defining the hole 7 for receiving a pin 9. The gusset 62 on base member 80 supports the plate 63 which carries the hook 60. The hook 60 is adjustably mounted on the gusset 62 by bolts 64.

The operation of the device will be described in the following paragraphs.

When the adapter 1 is supported on the draft arms 47 and the upper link 8, as illustrated in the drawings, an implement can be attached to the lower hooks 28 and 30 and the upper hook 13. The adapter is constructed of tubular material to provide the greatest structural strength. The upper hooks 13 and lower hooks 28 and 30 support the implement. It is understood that the implement to be attached to the adapter has a mast-carrying pin 16 and crossbars 29 positioned as shown. The vertical dimension, however, may be increased by repositioning the corrugated plate 14. When the bolts 15 are loosened the hook 13 may be moved upwardly or downwardly in any suitable position to accommodate connection to the implement. Its adjustment provides a purely vertical movement of the hook 13 relative to the lower hooks 28 and 30.

The extension members 54, 25 are connected to the arms 3 and 4 which extend downwardly and outwardly as shown in FIG. 1. The extension members 54 and 25 will simultaneously extend arms 3 and 4 in a horizontal and a vertical direction. This simultaneous movement will provide a shifting from category 2 to category 3 type implements providing an upper hook 13 is correctly positioned. It is also noted that further vertical or horizontal movement may be used to accommodate wear or different dimensions of an odd-size implement.

The preferred embodiment of this invention has been illustrated and described.

I claim:

1. A tractor hitch adapter for use with a three-point hitch having an upper link and two lower draft arms comprising, a tubular base member having two downwardly diverging arms, one tubular extension member connected on each one of said arms with each extension member having a lower hook with means adapted for connection to a lower draft arm and defining an extension portion forming telescoping means with its connected diverging arm, fastening means locking each extension member with one of said diverging arms for infinitely positioning said extension member relative to its connected diverging arm of said base member within a predetermined range, means adapted for connection to the upper link secured to the central portion of the base member, a center support integrally fastened to the center portion of said base member, an upper hook with vertical adjusting means connected to said support, thereby providing adjustable means on said adapter to facilitate vertical adjustment or simultaneous vertical and horizontal adjustment of said upper hook relative to said lower hooks.

2. A tractor hitch adapter as set forth in claim 1 wherein said upper hook and said support include mating serrated surfaces to firmly lock said hook in fixed relation to said base member selectively and alternatively in a plurality of vertical spaced positions.

3. A tractor hitch adapter as set forth in claim 1 wherein said means for connecting said base member to said upper link and said upper hook define an integral structure.

4. A tractor hitch adapter as set forth in claim 1 wherein said extension members define upwardly extending hooks and latching means to releasably secure crossbars of the implement.

5. A tractor hitch adapter as set forth in claim 1 for use with a three-point hitch including said upper hook, a cross pin for connection to an implement rotatably supporting an antifriction bearing for rotatably positioning said bearing in the lower position of said upper hook.

6. A tractor hitch adapter as set forth in claim 1 wherein said downwardly diverging arms define tubular portions receiving said extension portion of said extension members and provide a telescoping means of said extension members in said base member.

7. A tractor hitch adapter as set forth in claim 6 wherein said fastening means define recessed elements firmly drawn together by a bolt, said elements define recessed areas to form a concave portion on said engaging surfaces with said members to thereby firmly lock the members in any of infinite number of positions within a predetermined range of movement.

8. A tractor hitch adapter as set forth in claim 1 including fastening means defining locking elements firmly engaging the inner periphery of said extension member and the outer periphery of said base member to firmly lock the extension members on said base member in an infinite number of positions within a predetermined range.

9. A tractor hitch adapter as set forth in claim 1 wherein said support defines a gusset connected between said arms for supporting said upper hook.

10. A tractor hitch adapter as set forth in claim 1 wherein said upper hook and means for connecting to said upper link define an integral structure adjustably mounted on said support, said support defines a plate on the intermediate section of said base member to provide horizontal or simultaneous vertical and horizontal movement between the upper and lower hooks.